United States Patent [19]
Neu et al.

[11] 3,806,894
[45] Apr. 23, 1974

[54] BINARY DATA INFORMATION STORES

[75] Inventors: Georges Neu, Epinay Sur Seine; Jean Valin, Les Essarts Le Roi, both of France

[73] Assignee: Compagnie Internationale Pour L'Informatique, Louveciennes, France

[22] Filed: June 6, 1972

[21] Appl. No.: 260,175

[30] Foreign Application Priority Data
June 29, 1971 France ............................ 71.23568

[52] U.S. Cl. ............................ 340/173 R, 307/324
[51] Int. Cl. ...................... G11c 11/40, H03k 17/72
[58] Field of Search .................. 340/173 R, 173 FF; 307/313, 324

[56] References Cited
UNITED STATES PATENTS
3,714,637 1/1973 Beausoleil ...................... 340/173 R
OTHER PUBLICATIONS
"The Shockley 4–Layer Diode by Shockley Transistor Company (Unit of Clevite Transistor) Standford Indust. Park, Palo Alto Califonia, Mar. 1961, Electronics–August 10, 1964 pp. 66 to 73.

*Primary Examiner*—James W. Moffitt
*Attorney, Agent, or Firm*—Kemon, Palmer & Estabrook

[57] ABSTRACT

Storing in a high density monolithic integrable binary information store is based on the blocked and conducting conditions of digit cells each of which comprises a NPN and a PNP transistor members each having its collector directly connected to the base of the other one with the emitter of the PNP member connected to a line and the emitter of the NPN member connected to a column of a matricially arranged X-Y addressable store, with a constant D.C. voltage across the emitters of the cells through said columns and lines. Each column includes series connected resistance means switched from a higher to a lower value on activation of a column decoder output from which it is controlled whereby reducing the switching time of each cell connected to the said column and thereby producing a variation of potential across eachcell connected to said column which is in its each cell condition. Said variation is collected from the corresponding line of the store in a read-out condition thereof. In a write-in condition of the store, each digit signal applied to a line is shorter than or at most equal to the reduced switching time of a cell.

6 Claims, 11 Drawing Figures

BINARY DATA INFORMATION STORES

BRIEF SUMMARY OF THE INVENTION

The present invention concerns improvements in or relating to binary digit information stores having solid-state semi-conductor digit cells.

Two families of such kinds of stores are presently known, or of which known as the bipolar store utilizes to the conventional transistor technique. It operates on very short operative cycle times, of the order to about 50 of 100 nanoseconds. However the cost of a digit is presently too high to presently enable such stores to be used on a large scale:- also the area occupied by a digit cell does not permit monolithic integration of more than 256 digits per semi-conductor crystal and, further, the energetic consumption is as high as about 2 to 4 milliwatts. The other kind of such stores is based on the so-called MOS technique (MOS stands for "metal-oxide-semiconductor") and admits a far better monolithic integration with a digit cell density of about 4 to 1 with respect to the bipolar memory cell technique. The energetic consumption is distinctly lower, from about 200 to 400 microwatts per digit. Unfortunately, it presents an operative cycle time of the order of 300 nanoseconds to 1 microsecond, which is prohibitive in most cases. The fields of application of such stores are indicated on the attached FIG.1, the ordinates P of which represent the costs per binary digit in conventionally normalized units and the abscissae TC represent the operative cycle times termined as nanoseconds. The field of application of the bipolar kind store is shown at MB and the field of application of the MOS kind of store is shown at MOS.

It would of course be of advantage to have a further kind of store available, with operative time cycles substantially equivalent to those of bipolar store and a cost per digit substantially equivalent to that of a digit in the MOS store.

It is the object of the invention to so provide this further kind of binary information stores.

A known binary digit storing cell is made of two transistors, a NPN one and a PNP one each having its collector electrode directly connected to the base of the other one. Such a cell presents two stable conditions, a blocked condition and a conducting condition, provided a holding voltage is maintained applied across the emitters thereof.

It is a further object of the invention to base an information store organization on the fact that the switching time of such a cell from one of its condition to the other one is a function of the value of the voltage difference across the emitters thereof.

BRIEF DESCRIPTION OF THE DRAWINGS:

The accompanying drawings, further to the above described

Figure 1:
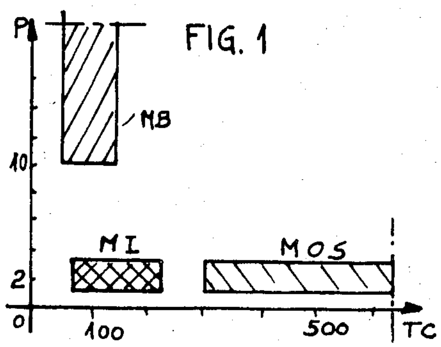
FIG. 1, shows.
Figure 2:
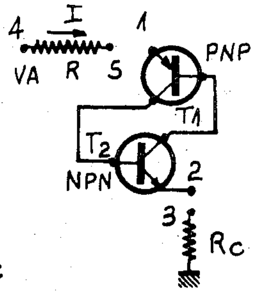
FIG. 2 the basic circuit of a digit cell in a store according to the invention, FIG. 3, a modification of the circuit of FIG. 2, FIGS. 4 and 5, respective static characteristic curves of a digit cell in a store according to the invention, FIGS. 6 and 7 two methods of integration of the basic circuit of FIG. 2, FIGS. 8 and 9, a method of integration of the circuit of FIG. 3, and, FIGS. 10 and 11, organizations of a store according to the invention and respectively comprising integrated structures of the circuits of the FIG. 2 and FIG. 3.

DETAILED DESCRIPTION:

In FIG. 2, T1 is a PNP transistor the collector of which is directly connected to the base of a NPN transistor T2 the collector of which is directly connected to the base of the transistor T1. The emitter of T1 is adapted to be, from its terminal 1, connected to a supply voltage terminal $V_A$ applied to a terminal 4 of a series resistor R the other terminal of which is shown at 5. When connected in a store organization according to FIGS.10 and 11, the terminal 5 is connected to a line of a matrix, on which are connected from their 1 terminals as many digit cells as required, i.e., as many digit cells are provided columns in the matrix. The terminal 2 of the emitter of T2 is adapted to be connected to the ground through a resistance Rc from the terminal 3 of said resistance. As will be clear from FIGS. 10 and 11, said resistance Rc will common to at least a group of digit cells along a column of the matrix.

Figure 3:
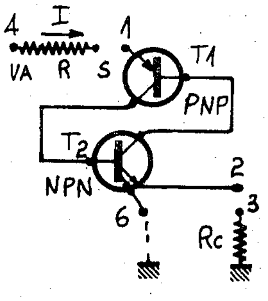

The circuit of FIG. 3 is identical to that of FIG. 2 except that the transistor T2 is provided with a double emitter according to a known technique. The second emitter is connected to a terminal 6 connected, in the store, to a conductor of a column, a conductor which, when required, will be connected th the ground.

Figure 6:
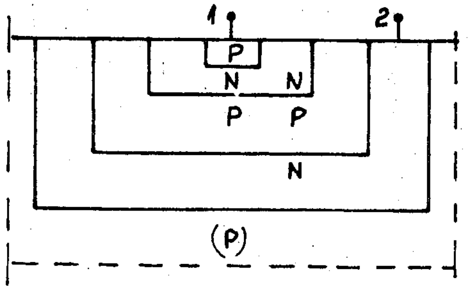
Figure 8:
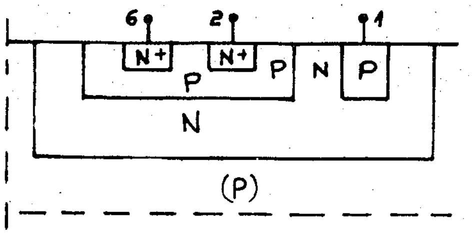
Figure 7:
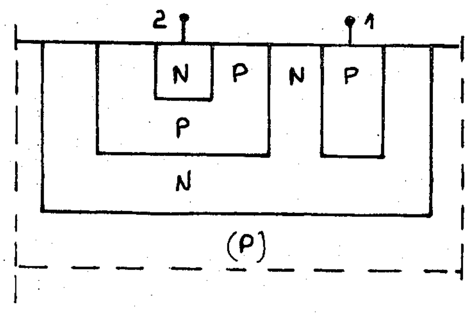
Figure 9:
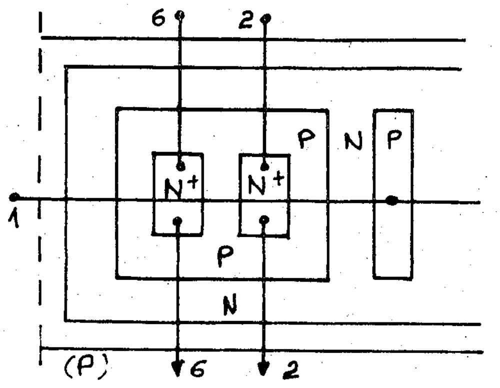

The method of making the digit cells of FIGS. 2 and 3 is easily understood with reference to FIGS. 6 and 7 for FIG. 2, and FIGS.8 and 9, jointly, for FIG. 3. In a silicon crystal, of the P type of conduction, used as a substrate for the cells as well for the other members of the store, junctions are formed which, one over the other as shown in FIG. 6, directly provide the transistors T2 and T1 respective NPN and PNP types interconnected between collector and base bothways, terminals 1 and 2 marking the emitters of said transistors of FIG. 2. FIG. 7 shows integration of the circuit of FIG. 3, obtained by forming two side by side junctions $N^+$—P in the part of the silicon acting as a base for the transistor NPN. As shown in FIG. 9, the side by side arrangement of the two emitters of the transistor NPN, zones $N^+$, and of the emitter of the transistor PNP, zone P, enables a simple provision of the line and column conductors of the matricially organized store, without any need of a two-layer printed circuit member. Two contacts are made on each $N^+$ emitter near the edges thereof and on each emitter P a single contact is provided near the middle of the emitter zone. The column conductors, metallized over the module, each pass at each cell through the zones $N^+$ but not over said zones, which permits the passage of any perpendicular line conductor such as 1 over such zones. Said line conductor being of course also metallized on the surface in the same operative step as the column conductor sections. Both metallizations are insulated from the surface of the semi-conductor crystal through an insulating film. Such an arrangement is obviously also applicable to the structures of FIGS. 6 and 7 when needed. Integration of such digit cells consequently is quite easy and, illustrativel in a monolithic structure having 9 $mm^2$ area surface, it is possible to provide a store modulus having 1024 memory digit cells plus the resistances Rc and R of the lines and columns, plus the decoder elements for the control of the read-out and write-in operations of the store, such elements being described with reference to FIG. 10 and 11.

Figure 4:
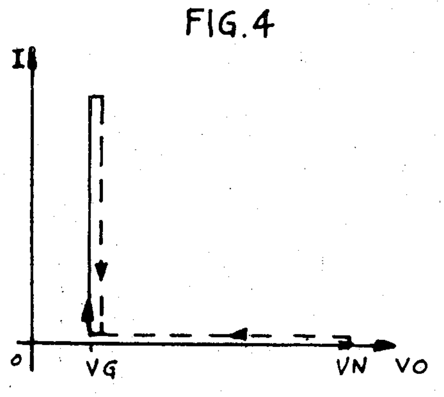
Figure 5:
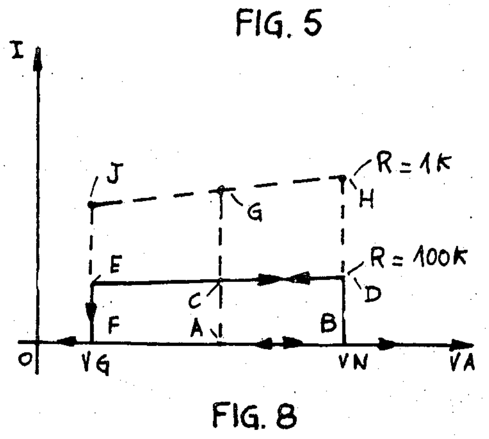

In order to define the physical properties of such digit cells, it will now assume that the terminal 5 is connected to the terminal 1 and the terminal 2 is connected to the ground, Rc being omitted in the circuit of FIG. 2 or in the circuit of FIG. 3 wherein further the terminal 6 is also assumed to be grounded. FIG. 4 shows the characteristic curve of the current I plotted to a voltage, Vo being the voltage across the terminals 1 and 2. FIG. 5 shows the characteristic curve I current/VA voltage, VA being the voltage supplied at the terminal 4. In both curves, I denotes the emitter current of T1 which, with the above assumptions, is identical to the current passing through R. In these curves, VG is the value of the voltage across 1 and 2 when both transistors are conducting. In actual practice, said value will be neighbouring 0.7 volts which is the saturation voltage of the two transistor structure. VN is the lowest voltage value at which a junction of the cell, preferably the base-collector junction of T1, offers no more resistance.

FIG. 4 shows that when the voltage Vo increases from 0 to VN with a substantially zero current since both transistors are blocked, the sudden passage of the said junction to practically zero resistance occurs at the value VN and consequently the collector current of T1, which is also the base current of T2 drives T2 to conduction. The collector current of T2, which is the base current of T1 drives T2 to conduction so that both transistors are now conducting in a stable saturated condition. Under such conditions, the voltage Vo is brought back to VG and the value of the current I only depends on the value of the load resistance R. The cell may be switched back to its first condition merely from reducing the voltage Vo to a value lower than VG. When the rest value of VA is of the order of 5 volts, the cell being saturated, at point C of FIG.5, and when the load resistance has a value of about 100 kilohms, the current is about 40 microamperes, The overall dissipation of the cell, including the associated load resistance, is of the order of 200 microwatts in the rest condition thereof, a value to be compared to the dissipation of power in a digit cell in a MOS store.

FIG. 5 shows that such a digit cell presents two stable conditions. When the cell is blocked and the value of the supply voltage is set at an intermediate value between VG and VN, a first stable condition is, for instance, at a point A. When the cell is conducting, for the same value of VA, a second stable condition is obtained, for instance at point C for a load resistance of about 100 Kilohms, or at a point G for a load resistance of the order of about 1 kilohm. Binary digit values may be attributed to such stable conditions: for instance, the condition corresponding to point C, or to point G, may be considered as a "1" representing condition whereas the condition corresponding to point A may be considered as representing a "0" value of the digit.

With such a correlation between the "1" and "0" binary digit values and the stable conditions of the cell, when a "1" must be written in a cell, the VA voltage must be increased higher than VN and thereafter be brought back to an intermediate value between VG and VN, such as a value from which the voltage excursion had started. When the cell already stored a "1", its stable point being at C when R equals 100 Kilohms, the excursion goes up to D and comes back to C. When the cell previously stored a "0", its stable point being at A, the excursion goes up to B, rises to D and then comes back to C. Writing a "0" necessitates only a reversal of the excursion of VA from VG and back. When the cell stored a "1", point C with R equals 100 kilohms, the excursion goes from C to E then to F and back to A. When the cell already stored a "0," the excursion merely goes back lower than F and then returns to A.

The lower the value of the load resistance, the quicker the switching time interval. Furthermore, the switching time intervals will be the shorter if the values VG and VN will be largely outpassed during the excursions of the supply voltage VA.

It must be noted that the NPN transistor has a conventional gain, of about 40 for instance, whereas the transistor PNP, does not have such a value of gain, so that integration is greatly eased. This is possible since both transistors are interconnected into a loop which intrinsically presents a high gain since it only depends on the gain of the NPN transistor. Under such conditions, the switching times are substantially equal to the time intervals of the control pulses producing the excursions of VA, of an order of about 10 to 50 nanoseconds for instance, a switching time which compares with that of the bipolar stores.

Such a digit cell may be read in a non destructive fashion. An apparent contradiction appears from the above, i.e., for a quicker switching of the condition of the cell, the load resistance must be advantageously low whereas, for a minimal dissipation of the cell, said load resistance must be as high as practically possible. A feature of a store according to the invention is the application of said apparent contradiction for obtaining a non destructive read-out of the cells and for assuming the actual addressing of said cells , as well for ensuring protection of unaddressed cells during a writing operation.

When a quick switching of the value of the load resistance from a value of the order of 100 kilohms for instance to a value of an order of 1 kilohm for instance is ensured, the characteristic of the cell passes from the full line curve to the interrupted line curve in FIG. 5. When a cell the load resistance of which is so switched is in its "1" representing condition, point C for a 100 kilohm resistance with a rest condition dissipation of reduced value, the position passes to point G of the curve VN-B-J-VG. This passage creates a variation of the current I which, once detected across the terminals of the cell, will give a read signal representative of the binary value "1". When on the other hand, the cell was in its "0" representing condition, point A of the curves, the switching of the resistance values has no effect, hence no variation of the current at the terminal 1 of the cell is produced.

In order to reduce such controls and switchings to actual practice, it is preferred to act not plainly on the load resistance R but, on the other hand, on the Rc resistance. This is possible because the "load" of a cell circuit actually comprises this Rc resistance in addition to the resistance R.

Figure 10:
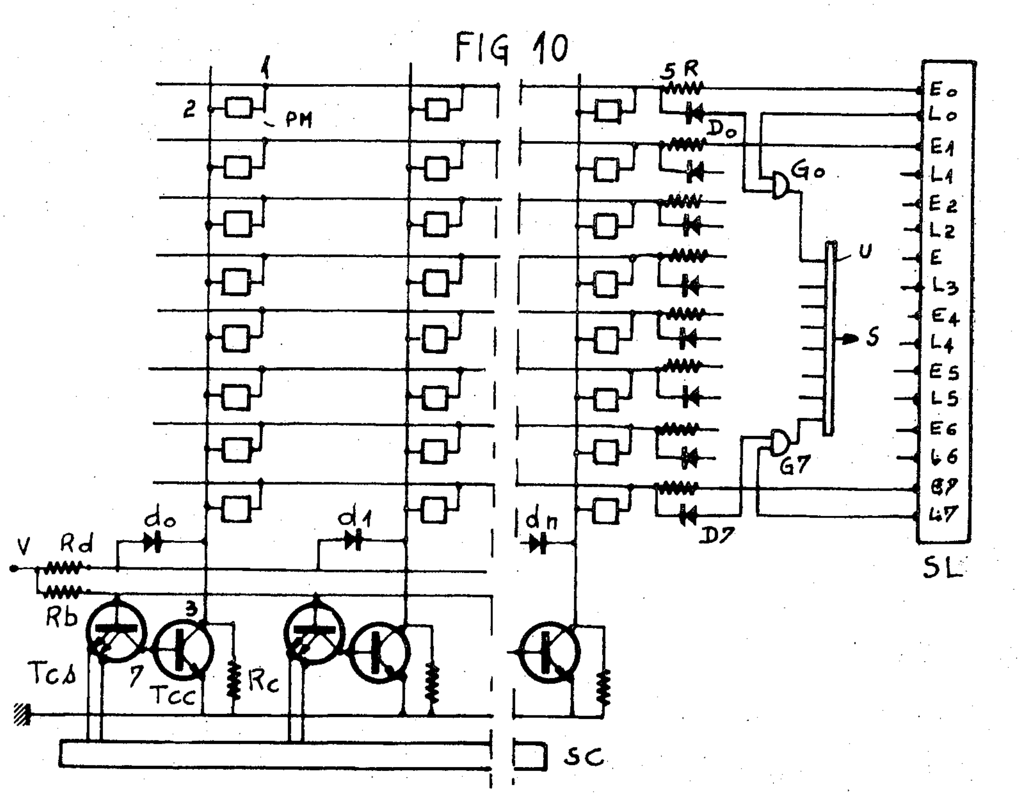

A matrix store organization wherein the digit cells are of the FIG. 2 circuit type is shown in FIG. 10. In this store, the 1024 memory points are distributed in 8 lines each of 128 memory points or cells. Each column comprises 8 cells PM the terminals 1 of which are connected to the rows and the terminals 2 of which are connected through a column conductor to a terminal 3 from which the resistance Rc is connected to the ground. A NPN control transistor Tcc is shunt connected to the resistance Rc of each column. The base of said Tcc transistor is connected at 7 to the collector of a NPN transistor Tcs, which is shown as being of the double emitter type for easing its control from a Y column address decoder SC. The resistances R of the lines are connected to outputs, from Eo to E7 of a pulse generator controlled from the decoding function of the X addresses of the lines in a decoder SL. The circuits SC and SL are conventional in the matrix/memory techniques. Decoder SL comprises outputs, Lo to L7 for authorizing the read-out of a signal from the eight ones which will appear on the lines. Consequently, from such an X-Y selection, access may be had to any cell of the 8x128 cells of the matrix. Eight gates Go to G7, receive the signals from the outputs L0 to T7 from SL and the signals from the terminals 5 of the lines through respective diodes from Do to D7.

The terminals of the Tcc transistors receive, from a terminal V, a calibrated voltage through a resistance Rb. Similarly, from V, a voltage which is calibrated by the series resistance Rd is distributed to the columns through diodes from *do* to *dn* (in the shown example, $n \approx 128$).

A write operation is obtained by simultaneously applying a line voltage and a column voltage, as is usual but, in a store according to the invention, the writing is obtained from exploiting the difference between the speeds of switching of a cell having a high value of load resistance, 100 kilohms for instance and of a cell having a low value of load resistance, 1 kilohm for instance. The resistances Rc are each provided with such a high resistance value and the resistances R are each provided of a relatively low value with respect to the one of the resistances Rc. The selection of a column is only made from the short-circuit of its resistance Rc as the transistor Tcc is made conducting under the control of the selection transistor Tcs activated from the corresponding output of the column address decoder SC. The cells PM which are connected to said selected column consequently present switching time intervals which are much shorter than the one of the cells which are connected to unselected columns. Illustratively, the switching time of a selected cell is substantially equal to 50 nanoseconds and the switching time of an unselected cell is substantially equal to 2 or 3 microseconds. The selection of a line is ensured by the application to the corresponding E terminal of a voltage pulse of a length substantially equal to the "short" switching time of a cell, which adds to the rest voltage V on all the terminals 2 of the cells which are connected to such a selected line. Consequently, only the digit cell which is simultaneously connected to a selected column and a selected line will be actually controlled and the condition thereof will be determined by the direction or polarity of the line voltage pulse. The conditions of all the other cells will be unaffected.

A read-out operation of the content of a digit cell also comprises a column selection operation based on the short-circuit of the resistance Rc in said column. No signal whatsoever is applied to a line of the matrix but, from activation the of an output L of the SL decoder, a gate G will be unblocked. Along the selected column, the digit cells which are in a conducting saturated condition answer to such a column selection by generating a short temporary voltage excursion on their respectively associated lines, responsive to their current excursion from C to G and back in FIG. 5. The line gate read-out selection produces the read-out of a single one of such cells. All the outputs of the gates G are united in the OR-circuit U to the external read-out conductors.

The operative cycle for write/read operation is in any case small and shorter than 150 nanoseconds in actual practice, including the of operation of the decoder time.

In the embodiment of FIG. 10, or in any other embodiment derived therefrom, the addressing decoder operation is not purely matricial because a single high resistance Rc cannot be provided for a relatively high number of digit cells along a column.

For obtaining a purely matricial decoder arrangement, hence optimalizing the decoder function for the store, the digit cell circuitry shown in FIG. 3 is used. It is possible with such a digit cell organization to group a number of cells, 8 for instance, on a common Rc resistance from their emitter terminals 2 and it is further possible to group several groups of cells, 4 for instance on the drawing, by their emitter terminals 6 on a single conductor comprising a short circuiting transistor switch Tcd which, when controlled from the activation of the corresponding output of SC, applies the ground to all the emitter terminals 6 of the cells connected to said conductor. This ensures the required short-circuit of the Rc resistances of the sections of columns as herein above defined at the very level of the double emitter terminals 2 and 6 of the cells. The organization of the line selections remains unchanged from the one of FIG. 10, and so is the actual operation of the write and read operations. A X-Y address is obtained from decoders each operating on the same number, for instance 32, of lines and columns.

Figure 11:
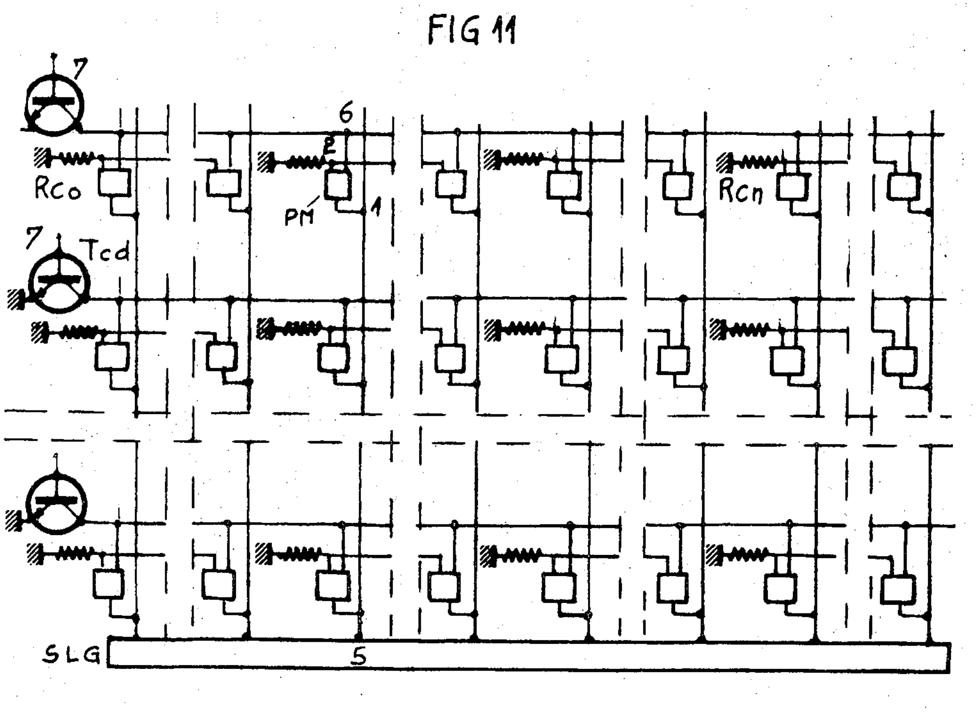

The operative cycle of a store according to the invention may be, as said, lower than 150 nanoseconds and the access time to the store may be lower than 30 nanoseconds. The dissipated energy per binary digit, when considering a 1024 cell store which all record a "1" binary digit, consequently all being in their conducting condition in the rest time intervals of the store and when such digits "1" are continuously read and rewrite, is lower than 350 microwatts per element which advantageously compare with the bipolar MB stores. Furthermore, a digit cell may be estimated equivalent to 1.3 transistors from the monolithic integration operation in a store organization as in FIG. 10. Thus one may consider a 4.5 transistors count per column for the decoders, consequently about 2 transistors per binary digit. With such an organization as shown in FIG. 11, said estimation drops to 1.5 transistors per binary digit.

In such conditions, the digit cost of a binary store according to the invention is substantially equals to that of a MOS store. All computations are made according to the presently convention rules therefor.

What is claimed is:

1. - High density monolithic integrable X-Y addressable binary information store comprising the combination of:

a matricial arrangement of one digit cells each of which comprises a NPN transistor and a PNP transistor, the collector of each of the said transistors being directly connected to the base of the other one, the emitter of the PNP transistor of each cell being connected to a line and the emitter of the NPN transistor being connected to a column of the matrix, D.C. constant voltage column supply means, series resistance means in each column of the matrix and means controlled from the Y address decoder means for switching the value of the said series resistance means from a higher value to a lower one on activation of the corresponding output of said decoder means, consequently reducing the switching time of any cell connected to the thus selected column and simultaneously producing in each cell connected to the said column and which is in its saturated conducting condition a short temporary excursion of the voltage on the line to which it is connected, means selectively connecting a line of the matrix to an output read-out terminal from the activation, during a read-out period of the store, of a line corresponding terminal of the X address decoder means of the store, and, means selectively connecting a line to a corresponding output of the said X address decoder means receiving, during a write-in period of the store, an information pulse of a length at most equal to the said reduced switching time of a cell.

2. - Store according to claim 1, wherein, the transistor NPN of each cell being only provided with a single emitter, said series resistance means comprises, per column and per Y address decoder output, a series resistance shunted by a transistor the condition of which is switched from a blocked condition to a conducting condition on the activation of the said decoder output.

3. - Store according to claim 1, wherein the NPN transistor of each cell is provided with two emitters, each column is subdivided into sections each of which are is defined by the connection of the first emitters of a number of cells to a grounded high value resistance and each column further comprises a ground connected transistor connected to the second emitters of all the cells of the column sections, said transistor being switched from a blocked to a conducting condition on activation of a corresponding Y address decoder output, consequently shunting the resistances of the said column sections at the level of the two emitters of the NPN transistors thereof.

4. - Store according to claim 1, wherein in each integration of the cells, the gain of the PNP transistor is less than the gain of the NPN transistor.

5. - Store according to claim 4, wherein each emitter is provided with two mutually spaced contacts and each column passes through such a space between contacts, the conductor thereof only comprising metallisations connecting the pairs of said emitter contacts from cell to cell in the column.

6. - Store according to claim 4, wherein the said resistances and their switching transistors as well as the X and Y address decoders are all integrated in each modulus of the store.

* * * * *